United States Patent
Howe

[15] 3,656,502
[45] Apr. 18, 1972

[54] FLUID CONTROL VALVE

[72] Inventor: Frank D. Howe, Painted Post, N.Y.

[73] Assignee: Ingersoll-Rand Company, New York, N.Y.

[22] Filed: July 7, 1970

[21] Appl. No.: 52,821

[52] U.S. Cl.........................137/327, 137/454.2, 137/512.1, 137/515.7
[51] Int. Cl..................................................F16k 51/00
[58] Field of Search.................210/232, 488, 492; 137/327, 137/454.2, 454.4, 454.6, 512.1, 515, 515.3, 515.5, 515.7; 251/148, 152

[56] References Cited

UNITED STATES PATENTS

| 880,746 | 3/1908 | Meriam | 137/454.2 X |
| 3,072,139 | 1/1963 | Mosites | 137/454.2 X |
| 2,994,342 | 8/1961 | Stillwagon | 137/454.2 |
| 3,202,175 | 8/1965 | Dumm | 137/454.2 |
| 3,358,710 | 12/1967 | Page | 137/512.1 |
| 3,409,268 | 11/1968 | Gachot | 137/454.2 X |
| 3,424,430 | 1/1969 | Hoelsch | 251/148 |

FOREIGN PATENTS OR APPLICATIONS

| 221,164 | 9/1924 | Great Britain | 137/512.1 |
| 1,210,012 | 9/1959 | France | 137/454.2 |

Primary Examiner—Samuel B. Rothberg
Assistant Examiner—David J. Zobkiw
Attorney—Frank S. Troidl, David W. Tibbott and Bernard J. Murphy

[57] ABSTRACT

The valve is of the flat, channel, check-type; its guide plate has an extending tab portion which can be grasped, the tab providing means by which the whole valve can be withdrawn from and inserted into the valve-using machine. This obviates any need to dismantle the machine to gain access to the valve.

The valve includes a position orientating beveled slot in the valve seat and plates to facilitate proper installation of the valve, and teflon coating on the seat and plates, the latter providing a gasketing surfacing and to facilitate cleaning.

5 Claims, 3 Drawing Figures

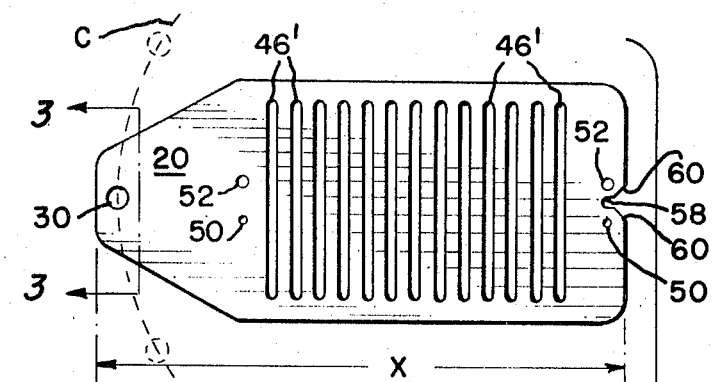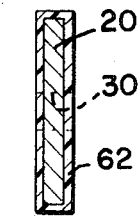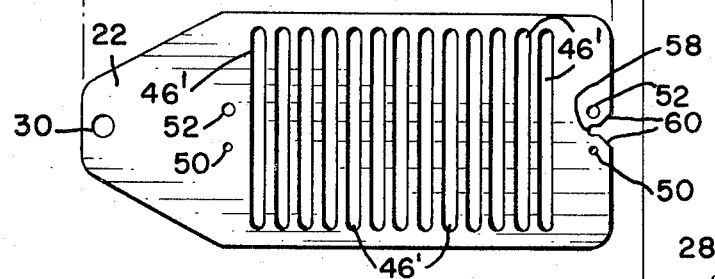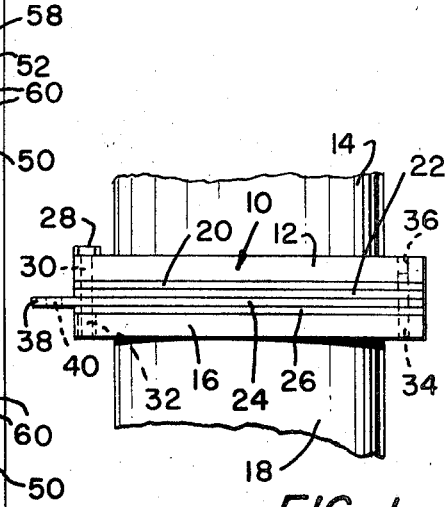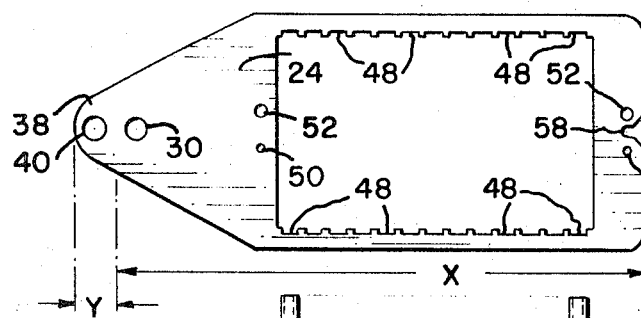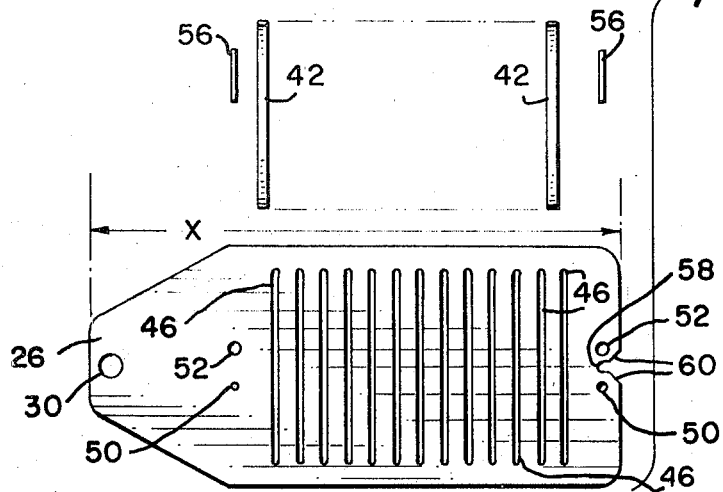
INVENTOR
FRANK D. HOWE
BY
AGENT

FLUID CONTROL VALVE

This invention comprises fluid control valves and, in particular, pertains to such valves which constitute a whole packaged assembly which can be interposed in a fluid flow pathway.

Valves of this type which are known in the prior art define an assembly which is confined within, or which are only co-extensive with, the peripheries of a cylinder cover and cap, or equivalents, between which such valves are disposed. Accordingly, in order to perform maintenance on the valve it has been necessary, heretofore, to dismantle the machine, in part, to gain access to the valve to effect its removal and installation. Servicing of such valves is somewhat difficult, also, in that they present a metal-to-metal interfacing with machine components which ordinarily does not accommodate the sliding removal of the valve from the machine.

It is an object of this invention to teach an improved fluid control valve which avoids the limitations known in the prior art. It is another object of this invention to teach a valve for removable installation in a machine for controlling fluid flow therein which comprises a plurality of valve elements and means pinning said elements together wherein at least one of the elements has means for receiving but one fastener for fixing the valve in the machine and means integral therewith for handling use to facilitate installation in, and removal of the valve from the machine.

A feature of this invention comprises the use of a guide plate which has an extending tab portion by means of which the valve can be grasped and withdrawn from the machine. The valve has only one bolt hole therethrough for fixing the same in position in the machine, however, it also has an orientating beveled slot for positioning the valve properly in the machine, and each of the valve plates and the valve seat are coated with polytetrafluoroethylene (i.e., "Teflon"). The coating provides a seal-gasket feature between the interfacing plates, presents a sliding surface to the adjacent machine components, and facilitates cleaning of the components so coated.

Other objects and features of this invention will become more apparent by reference to the following description taken in conjunction with the accompanying figures.

FIG. 1 is a vertical elevation view of the novel valve shown in use between an inlet duct and a cylinder inlet cover of a gas compressor;

FIG. 2 is a modified exploded view, of the valve of FIG. 1, in which the stop plate is shown in the bottom and the several components shown thereabove are assemblied to the stop plate in the order of vertically ascending sequence as shown; and FIG. 3 is a cross-sectional view of the valve seat, taken along section 3—3 of FIG. 2, showing the teflon, coating thereon; this teflon coating is common to all of the plates as well as the valve seat.

As shown in FIG. 1 the valve 10 of the channel, check type, and configured to serve an "inlet" function, is disposed between a flange 12 of an inlet duct 14 of a gas compressor and the flange 16 of the compressor cylinder inlet cover 18 Duct 14 and cover 18 are depicted more symbolically than pictorically; the configuration of each is not germane to the instant invention. From what this view can fairly show, the valve 10 comprises a valve seat 20, a seat plate 22 a guide plate 24 and a stop plate 26. A bolt 28 is in penetration of both flanges, and the valve seat and the plates as well, by means of bore holes 30, and is threadedly fastened in a tapped hole 32 formed in flange 16. The rigid bolting together of the flanges 12 and 16, to mate the duct 14 and cover 18 does not concern this invention. It is customary for a plurality of bolts such as bolt 28 to be deployed about the peripheries of the flanges, on a bolt hole circle "C" such as that simulated in FIG. 2 in dashed outline. Only one bolt 28 is shown, however, because it is a teaching of this invention to have only one of the fastening bolts 28 in penetration of the removably installed valve 10.

Flange 16 has a locating dowel 34 staked therein and projecting therefrom for alignment with a dowel hole 36 in flange 12. The dowel 34 locates the two flanges 12 and 14 together for proper orientation, but it also serves to locate the valve 10 upon installation thereof.

With this teaching only one bolt 28 needs to be withdrawn from the machine to accommodate the removal of the valve 10; all other such bolts need only to be loosened. That is to say, the flanges 12 and 16 do not need to be separated from each other to accommodate installation of valve 10. The guide plate 24 has an extending portion, tab 38, through which there is formed a tool hole 40. To service the valve 10 it is necessary only to place a tool through hole 40, after having removed bolt 28 and loosened all other flange-to-flange bolts, and then slide the entire valve 10 from between the flanges 12 and 16, by pulling on the tool. The guide plate has a longitudinal dimension of "X" + "Y" as shown in FIG. 2, which is greater than the longitudinal dimension of corresponding surfaces of plates 22, 26 and seat 20; these have a length of only "X." Thus, tab 38 extends from the valve 10 and, in use, from the valve-using machine.

As shown in FIG. 2, the valve 10 shown includes leaf type valve springs 42 and valve channels 44. The valve channels 44 are restrained by the springs 42 above the lands adjacent to the elongated ports 46, of stop plate 26. In the "normally closed" position-function of this valve 10, the channels 44 close off the aligned, elongated ports 46' of seat 20 and plate 22. The valve guide plate 24 has a series of channel-guiding recesses 48 for receiving the channels 44 therein. Each of the plates 22, 24 and 26 and the valve seat 20 as well, has pairs of assembly pin holes 50 and 52 which are presented to receive pins 54 and 56 to insure a proper assembly of the valve after maintenance thereon has been completed.

The valve seat 20 and each of the plates 22, 24, and 26 has formed therein an orientation slot 58. The outer extremity of the slots 58 is beveled to provide access surfaces 60 for engaging the locating dowel 24.

FIG. 3 is presented simply to show that the valve seat 20 is teflon-coated on both sides. The teflon coating 62 provides a sealing gasketing between the seat 20 and plate 22. However, although only seat 20 is shown thus, the plates 22, 24, and 26 are also teflon-coated. The coating 62 of seat 20 and plates 22, 24, and 26 facilitates the sliding removal and installation of valve 10, and cleaning of each of the coated components during maintenance servicing. What is shown in FIG. 3 for the valve seat 20, therefore, is to be understood to obtain for plates 22, 24 and 26.

While I have described my invention in connection with a specific embodiment thereof, it is clearly understood that this is done only by way of example and not as a limitation to the scope of my invention as set forth in the objects thereof and in the appended claims.

I claim:

1. For use in combination with a machine having a valve-locating dowel means or the like, a valve for removable installation in said machine for controlling fluid flow therein, comprising:

a plurality of valve elements; and means effecting simple pinning together of said elements in an operative relationship; wherein at least one of said elements has only a single borehole formed therein for throughgoing penetration thereof by a fastener for fastening of said pinned elements in said machine;

at least one of said elements has an extending tab portion formed integral therewith, said tab portion having a tool hole formed therethrough for manipulative use during, and to facilitate, installation of said valve in, and removal thereof from, said machine;

at least a given element of said plurality of elements has single means cooperative with such valve-locating dowel means for orientating said valve in proper operative disposition in said machine;

said given element comprises a plate having a given longitudinal axis, and said cooperative means comprises a single slot formed in said plate; and said single fastener-borehole and said tool hole are disposed adjacent one axial end of said plate, and said single slot is disposed the opposite axial end of said plate.

2. A valve, according to claim 1, wherein:

said plate has terminal edge, said slot is interruptive of said edge, and has beveled access surfaces formed therein, contiguous with said edge, to facilitate alignment of said slot with said valve-locating dowel means.

3. A valve, according to claim 2, wherein:

said plurality includes stop plate guide plate and valve seat; and wherein said seat and all of said plates each have gasketing means on at least one planar surface thereof.

4. A valve, according to claim 3, wherein:

said seat and all of said plates each have gasketing means on interfacing planar surfaces thereof.

5. A valve, according to claim 3, wherein:

said seat and all said plates each have only a single fastener-borehole formed therein for throughgoing penetration thereof by such fastener means; and said seat and all said plates each have said single slot for cooperative engagement with such dowel means for orientating said valve in proper operative disposition in said machine.

* * * * *